May 13, 1930.  L. C. MARSHALL  1,758,575
PROCESS OF MAKING PISTON RINGS
Original Filed Oct. 16, 1925   2 Sheets-Sheet 1
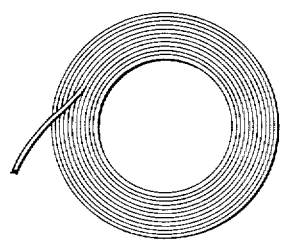
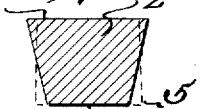
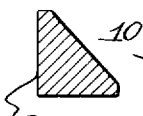
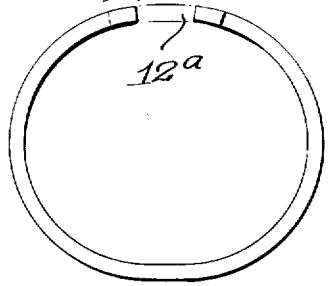
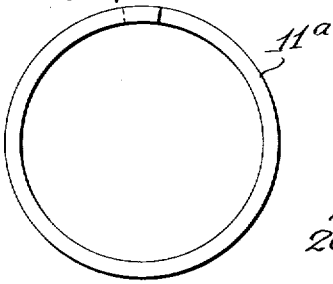
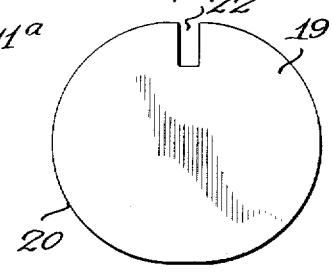
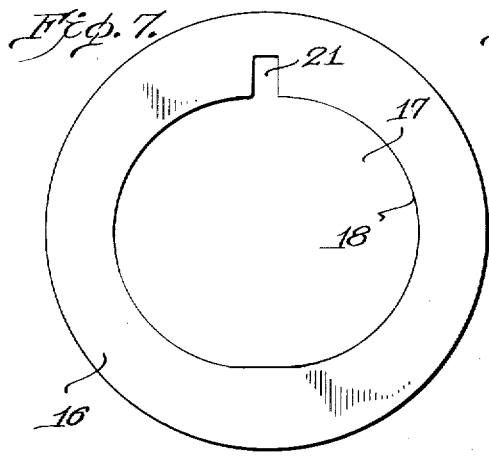
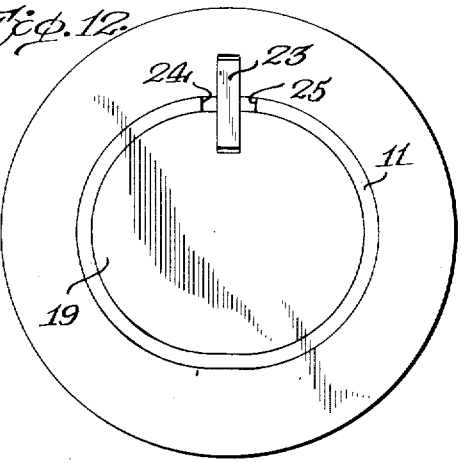
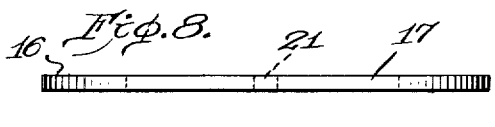
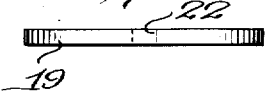
Inventor
Lewis C. Marshall
By Roberts Cushman Woodberry
Attorneys

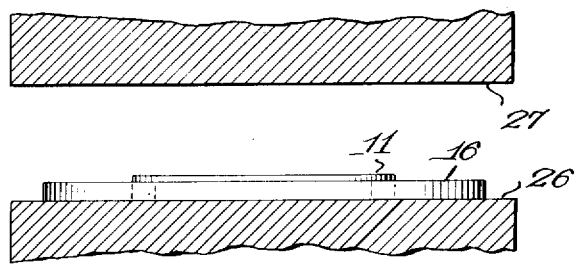
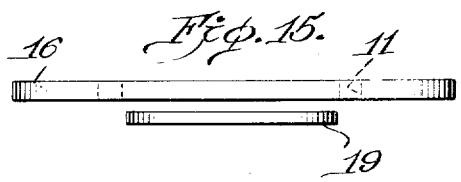
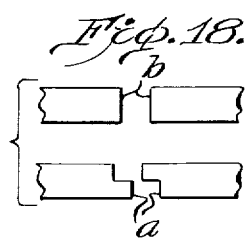
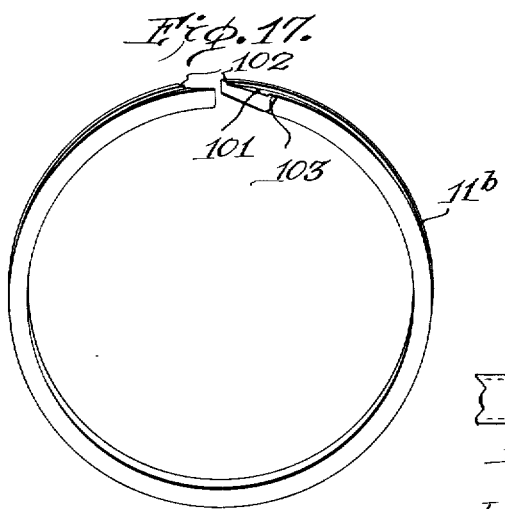
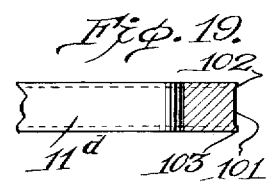
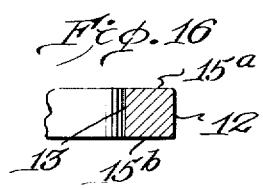

Patented May 13, 1930

1,758,575

UNITED STATES PATENT OFFICE

LEWIS C. MARSHALL, OF WALPOLE, MASSACHUSETTS

PROCESS OF MAKING PISTON RINGS

Original application filed October 16, 1925, Serial No. 62,825. Divided and this application filed September 15, 1927. Serial No. 219,657.

This invention pertains to metallic packing rings of the type employed in the pistons of internal combustion engines and relates more particularly to a process of making the same, the present application being a division of my copending application Serial No. 62,825, filed October 16, 1925.

Piston rings for internal combustion engines have commonly been made of cast iron, since this has seemed to be the best available material having the requisite capability of withstanding operating temperatures, the necessary elasticity to provide a gas-tight contact with the cylinder walls, and ability to maintain a good bearing surface against the cylinder wall without scoring or abrading the latter when run at high speeds.

While cast iron possesses these characteristics, it also has others which are not so desirable, among which may be mentioned its extreme brittleness, especially noticeable when of small cross section, and its lack of homogeneity, which result in a substantial breakage loss of piston rings at all stages of manufacture, transportation, and use; the impossibility of working cast iron except by the relatively expensive processes of cutting and grinding; and the relatively low elasticity of cast iron as compared with that of other materials, for example steel.

These defects in cast iron as a material for use in making piston rings has led to attempts to adopt other materials for the purpose, but so far as I am aware no success has attended these efforts. Among the materials which it has been attempted to employ may be mentioned low carbon steel, but while this material appears from many standpoints to be eminently well suited for the purpose by reason of its elasticity, ease of working, uniformity, and ability to withstand high temperatures, it possesses one vital defect which has absolutely precluded its commercial use for this purpose, this defect being its inability to form a good wearing surface with the cylinder wall, resulting in rapid scoring and destruction of the cylinder.

Through the course of a long series of experiments I have found that a piston ring made of high carbon steel, that is to say steel of over 0.5 per cent carbon, may be run for a far longer time, even under the exacting conditions of a continuous uninterrupted run, than does the ordinary cast iron ring, outlasting the latter many times, acquiring a high polish, and causing no appreciable wear or scoring of the cylinder wall, and I have devised a practical process which results in the production of perfect rings from ductile material such, for example, as high carbon steel, including so called "alloy steels," such rings having all of the desired physical characteristics requisite in a piston ring and being capable of production at a cost which is substantially less than that involved in making ordinary cast iron rings.

In the accompanying drawings I have illustrated by way of example one process which may be employed in producing my novel ring together with certain appliances useful in practicing the process.

Referring to the drawings,

Fig. 1 is a plan view of a coil of wire, illustrating one form in which the material for use in making the improved packing may be provided;

Fig. 2 is a section to large scale showing a preferred shape of wire for use in making my improved packing;

Fig. 3 illustrates in enlarged section various forms of wire which may be employed if desired;

Fig. 4 is a plan view of a ring formed by bending a piece of wire or rod, and showing substantially the desired contour of ring for producing equal expansive pressure upon the walls of an engine cylinder;

Fig. 5 is a view of the same ring with its gap closed, and indicating its circular contour when in use;

Fig. 6 is a fragmentary perspective view of the ring showing the latter in transverse section and to larger scale and illustrating in an exaggerated way the bulge of the radial faces of the ring which may be produced in bending it;

Fig. 7 is a plan view and Fig. 8 is an edge elevation of a preferred form of outer template member useful in practicing my process;

Fig. 9 is a plan view and Fig. 10 an edge elevation of an inner template or core member useful in conjunction with the outer member shown in Fig. 7;

Fig. 11 is a perspective view to larger scale showing a positioning or locking key for retaining the template members in proper angular relationship;

Fig. 12 is a plan view showing the template members assembled and with the ring disposed between them;

Fig. 13 is a fragmentary vertical section showing upper and lower press platens and the assembled template with its ring interposed between them in position for the pressing operation;

Fig. 14 is an edge elevation of the assembled template with the ring substantially as it appears after the pressing operation;

Fig. 15 is a similar view showing the inner template or core member removed preliminary to removal of the completed packing;

Fig. 16 is a transverse section to larger scale of the completed packing;

Fig. 17 is a perspective view of the completed packing;

Fig. 18 illustrates alternative forms of gap in the ring; and

Fig. 19 is a section similar to Fig. 16 showing a preferred ring construction obtainable by the herein described process.

Referring to the drawings, the numeral 1 (Fig. 1) indicates a coil of wire suitable for use in making piston rings. While I prefer to provide the material in the form of a coil since it is easier to transport it and to use it in this form, I contemplate that it may be provided in the form of rods or bars if preferred.

In Fig. 2 I have illustrated a preferred shape of wire for use in making packing rings of substantially rectangular cross section. This preferred shape, which may be likened to the shape of a keystone, has one face 3 substantially wider than the opposite face 4. When wire of this section is bent with the narrow face 4 at the inside of the bend, the flow of the metal under the stress of bending tends to but does not completely restore the wire to substantially rectangular form, as indicated in dotted lines at 5.

While the wire shown in Fig. 2 is preferable in making rings of ordinary type, I contemplate that wires or rods of other section may be used. Thus in Fig. 3 the numeral 6 indicates a wire or rod of substantially square section; the numeral 7 a wire or rod of elongate rectangular form; the numeral 8 a wire or rod having a beveled face; the numeral 9 a wire or rod of generally rectangular form but having a groove in one of its faces; the numeral 10 a wire or rod having a convex face; and the numeral $10^a$ a round wire or rod.

Whatever the shape of these wires or rods, I make them of some ductile metal which is capable of making a good bearing surface in contact with the cylinder wall without danger of scoring or otherwise injuring the latter. While I contemplate that other materials may be found useful for the purpose, I apprehend that various ferrous alloys, that is to say simple alloys of iron and carbon as well as alloys of iron, carbon, and other elements, will be found particularly suitable for the purpose, and I prefer to employ steel having the general physical characteristics (in particular the hardness) of steel of from 0.6 to 0.7 percent carbon content which I have found to be eminently suitable, although steel of much higher carbon content may be used for the purpose, within the scope of my invention.

This material may be procured in the form of wire or rods of the desired section, being manufactured in accordance with any of the usual methods and may, after bending, be heat treated or tempered if desired. Whether or not thus first heat treated or tempered it is bent to the proper shape hereinafter described by means of any suitable apparatus or appliance. If initially soft or annealed the requisite temper may be imparted by the cold working of the metal incident to bending, or if necessary by heat treatment after bending. Whatever method may be preferred, I bend the material to form a single annular turn or ring 11 with a gap $12^a$ at one point, such ring preferably being of substantially the contour shown in Fig. 4, and I cut off from the wire or rod the necessary length to make such turn or ring either before, during, or after bending—the cutting operation being so performed as to produce approximately the desired shape of ring end. For example, the material may be severed obliquely, as indicated in Figs. 4, 5 and 17, to provide the ring with beveled, overlapping ends, or may be cut to form overlapping tongues and recesses, as shown at $a$ Fig. 18, or it may be cut radially to provide plane ends, as shown at $b$ Fig. 18. The ring is preferably so bent as to give it the more or less flattened or elliptical shape as shown in Fig. 4 with the gap $12^a$ at one end of its minor axis. When such a ring is unconfined it has a substantial gap $12^a$ as shown, but when the ring is radially compressed this gap is substantially closed and the ring takes the circular form indicated at $11^a$ in Fig. 5 and acts with substantially equal resilient pressure in all radial directions.

After bending, the section of the ring will be more or less as indicated in Fig. 6 wherein the outer surface 12 and the inner surface 13 of the ring are substantially straight transversely, while the radial faces 14 and 15 are more or less irregular or bulged. In Fig. 6 this irregularity or bulging has been greatly exaggerated for purposes of illustration, although in the actual ring this irregularity or bulging is often quite appreciable so that it is usually desirable to finish these surfaces in order to provide close contact with the opposite walls of the piston groove.

In Figs. 7 and 8 I have illustrated an outer template member consisting of a flat plate of metal, preferably hardened steel or steel alloy, of a thickness preferably slightly less than that of the finished packing. This plate may be of any desired shape, although I prefer to employ a circular plate for ease in handling. This plate is provided with a central opening 17 whose inner edge surface 18 is finished to the contour of the outer peripheral surface of the desired packing ring. I also provide a secondary template or core member 19, of approximately the same thickness as the member 16, having an outer edge surface 20 finished to fit within and conform to the interior of the desired finished packing ring. The member 19 is of such size that when placed within the opening 17 of the member 16 a groove or channel is provided between the opposed edges of the template members having the cross section of the desired packing.

In order that the member 19 may readily be assembled with the member 16 in proper angular relation thereto, I prefer to provide one of the template members, for example the member 16 with a slot 21 and the other member, for example the member 19, with a complemental slot 22 and to provide a removable key or pin 23 whose opposite ends may be seated in the slots 21 and 22 respectively. Alternatively the key may be permanently attached to one of the template members.

While I may employ this or other positive means for temporarily retaining the template members in proper angular relationship I may, if desired, dispense with such means and merely provide positioning marks upon the surface of the template members to enable the user to place them in the proper angular relationship.

Having provided a template of this character, I place the ring 11 within the template member 16 with the gap 12ª in the ring positioned so that its opposite ends 24 and 25 are disposed upon opposite sides of the slot 21 and insert the key 23, if this key be an independent member. I now place the inner or core member 19 within the ring positioning it so that the end of the key 23 enters the slot 22. With the parts thus arranged the radial faces 14 and 15 of the ring 11 project slightly beyond the surfaces of the template members. I now preferably place the template with its enclosed ring between the platens 26 and 27 (Fig. 13) of a powerful press and bring the movable platen forcibly against the ring. Any other suitable type of press or impact means such as a hammer may be employed for the purpose if desired. I thus cause the metal of the ring to flow into contact with the opposed faces of the template members and at the same time flatten the radial faces of the ring and reduce the ring to the axial thickness desired.

During this pressing or hammering operation the metal flows to some extent in a circumferential direction, that is to say, the ring 11 is thereby somewhat elongated, and when the radial faces of the ring are to be flattened in this way, allow for this elongation by forming the ring 11 initially with a somewhat wider gap than that desired in the finished packing.

After the pressing operation has been completed the template is removed from the press and at this time presents substantially the apparance shown in Fig. 14 wherein the ring has been reduced to its desired finished thickness. Since the pressure forces the ring very firmly against the opposed faces of the template members it is first necessary to remove the core member before the ring can be disengaged. The core member 19 is therefore pushed or driven out in an axial direction as indicated in Fig. 15, preferably by tapping it with a mallet or by pressure. When the core has been removed the finished packing may be sprung away from the walls of the template and removed from the latter.

The finished packing indicated at 11ᵇ in Fig. 17 will now be found to have its radial faces 15ª and 15ᵇ in substantial parallelism, such faces being smooth and adapted to make proper contact with the opposite side walls of the piston groove.

Ordinarily if the template members as above suggested be made somewhat less in thickness than the axial width of the initially formed ring, the finished ring, when removed from the template after the pressing operation, will be found to have substantially the cross section shown in Fig. 19. In this figure the ring is indicated by the letter 11ᵈ and the outer circumferential surface of the ring is designated by the numeral 101. When the template is of the dimension just suggested it is found that the finished ring has circumferential ridges or ribs 102 and 103 respectively at its outer corners. These ridges or ribs are very small, being greatly exaggerated in the drawings, that is to say, of the order of 0.0005 inches in radial thickness and of substantially the same or slightly greater axial dimensions. While these ridges or ribs may, if desired, be removed by grinding or other suitable finishing operation I find that it is very advantageous to leave such ridges or ribs upon the finished ring, since they provide quick seating surfaces for engagement to the cylinder wall. Since the ridges or ribs are of such small dimensions they wear with relative rapidity and thus conform themselves to the cylinder wall much more quickly than would be the case if the outer peripheral surface of the ring were of plain cylindrical form.

Since the pressing operation may be performed in an extremely short interval of time this step in the process of making the rings may be accomplished with rapidity. In the commercial production of rings in accordance with this process I contemplate that a large number of the templates will be provided and that one operator will insert the rings within the template, another will perform the pressing operation, and a third will remove the rings from the template. Possibly the pressing operation and removing operation may be carried out so quickly that several operators may be required to insert the rings within the templates to keep up with the production of the press, and I contemplate the provision of automatic feeding and removing means as within the range of possibilities.

Instead of finishing the radial faces as above described they may alternatively be finished by grinding or other known processes, but I believe that superior results are obtained and at less cost by the first described process.

While I have herein shown the template members as having their inner edge faces perpendicular to their upper and lower faces, I contemplate that these inner faces may be given any desired shape or contour so that the inner and outer peripheries of the finished packing may be given the desired shape through the pressing operation. Thus even if starting with a wire or rod of substantially the section shown best in Fig. 3, such wire or rod, by the provision of template members of proper surface contour, could be reduced to the shapes shown for example at 8, 9 or 10 in Fig. 3, and it is obvious that an almost limitless variety of ring sections may thus be produced.

I further contemplate the flattening of the radial faces of the ring by pressure without the use of the templates, but find that when enclosed in such templates less power is required to perform the desired operation, and for this reason, among others, prefer the processes as above described.

Summarizing the above and stating the several operations purely in terms of a method and without reference to specific mechanism for carrying it into effect, my new process comprises a series of steps, some of which step I apprehend may be omitted or replaced by others as conditions vary, among which may be mentioned the drawing of the material selected (which must possess the requisite physical characteristics for forming a good bearing against the cylinder wall, one such material as above stated being high carbon steel of a carbon content of over 0.5 per cent) into the form of a wire or rod (the terms "wire" and "rod" herein being employed indiscriminately as comprehensive of any elongate element of indefinite length and of relatively small cross section) of substantially, although not necessarily, the section of the proposed packing. This wire or rod may now be heat treated or tempered to the desired degree and is then bent by means of any suitable machine or appliance to form a ring having substantially the contour of the desired packing. While the heat treatment or tempering of the wire is preferably performed before bending, I contemplate that annealed wire or rod may be employed and given the necessary temper by cold working or bending or by heat treatment after bending. Moreover, the proper length of material to form the ring may be severed from the original length of wire either before or after bending. The circumferential length of the wire forming the embryo ring at this stage of the process may be slightly less, for example, from 2/1000 to 4/1000 of an inch, then the circumferential length of the finished packing, or it may be the same, depending upon the character of the succeeding operation.

In whatever way the wire is bent, and whether before or after tempering, the ring formed at this stage of the process preferably should have such a peripheral contour that when it is compressed within the engine cylinder it will bear with substantially equal radial pressure against all points of the cylinder wall.

Having produced this initial or embryo ring I may if it seems desirable or necessary finish its radial faces to bring them into true parallelism.

The radial faces may be finished in various ways, for example, by grinding or by subjecting them to pressure between accurately flat parallel surfaces. In the latter case the ring is preferably confined within predetermined bounds circumferentially before the application of the pressure to the radial faces of the ring.

While the above described process results in the production of satisfactory rings it is possible to make such rings by a modified process, such a modified process being disclosed in my copending application Serial No. 195,720, filed June 1, 1927.

While as above pointed out my improved process lends itself particularly well to the production of packing rings of high carbon steel, I wish it to be understood that it is not necessarily confined to the production of rings of this particular material since I contemplate that other materials may be found useful for the purpose.

I claim:

1. That process of making strong, tough and durable radially expansible split packing rings capable of sliding in contact with the inner surface of a cylinder wall under normal working conditions without scoring the wall, which comprises as steps bending a length of steel wire or rod of at least 0.5 per cent carbon to form a single annular turn provided with a gap at one point, and severing said turn from the said length of material.

2. That process of making strong, tough and durable radially expansible split packing rings capable of sliding in contact with the inner surface of a cast iron cylinder wall under normal working conditions without scoring the wall, which comprises as steps bending a length of steel of a hardness approximating that of carbon steel of at least 0.5 per cent carbon and of desired transverse section to form a single annular turn having a gap at one point.

3. That process of making radially expansible split packing rings which comprises as steps bending a length of wire or rod of a strong, tough and durable material capable of sliding in contact with the inner surface of a cast-iron cylinder wall under normal working conditions without scoring the wall to form a single substantially plane annular turn having a gap at one point, and severing said turn from the length of material.

4. That process of making strong, tough and durable radially expansible split packing rings capable of sliding in contact with the inner surface of a cast-iron cylinder wall under normal working conditions without scoring the wall, which comprises as steps bending a length of hard steel wire or rod of at least 0.5 per cent carbon to form a single plane annular turn having a gap at one point, said turn being substantially elliptical in contour with its gap disposed substantially at one end of its minor axis.

5. That process of making strong, tough and durable radially expansible split packing rings capable of sliding in contact with the inner surface of a cylinder wall under normal working conditions without scoring the wall, which comprises preparing a length of steel rod of approximately the cross section of the desired ring and having a carbon content of from 0.6 to 0.7 per cent, tempering said length of rod, and bending the tempered rod to form a split radially expansible ring.

6. That process of making strong, tough and durable radially expansible split packing rings capable of sliding in contact with the inner surface of a cylinder wall under normal working conditions without scoring the wall, which comprises as steps bending a length of steel wire or rod of a carbon content of at least 0.5 per cent carbon to form a single annular turn having a gap at one point, and severing said turn by a cut which furnishes the ring with an end of substantially the desired shape.

7. That process of making strong, tough and durable radially expansible split packing rings capable of sliding in contact with the inner surface of a cast-iron cylinder wall under normal working conditions without scoring the wall, which comprises as steps bending a length of wire or rod of a hardness approximating that of steel of at least 0.5 per cent carbon to form a single annular turn having a gap at one point, and severing said turn from the length of material by an oblique cut to give the ring a beveled end.

8. That process of making strong, tough and durable radially expansible split packing rings capable of sliding in contact with the inner surface of a cylinder wall under normal working conditions without scoring the wall, which comprises as steps preparing a length of steel of more than 0.5 per cent carbon adapted to cooperate with a cylinder wall to form a good reciprocating bearing, bending such length of steel to form a split piston ring of approximately the desired contour, and flattening the radial faces of the ring by axial pressure to reduce the ring to its final axial thickness.

9. That process of making piston packings which comprises as steps bending a length of steel of more than 0.6 per cent carbon content to form a split ring of substantially the desired peripheral contour, and subjecting the ring to axial pressure between plane parallel surfaces to flatten its radial faces and bring them into parallelism.

10. That process of making strong, tough and durable radially expansible split packing rings capable of sliding in contact with the inner surface of a cylinder wall under normal working conditions without scoring the wall, which comprises preparing a length of steel rod of a cross section such that when bent to ring form it will be substantially of the cross section of the desired ring and having a carbon content of from 0.6 to 0.7 per cent, bending the rod to form a split, radially expansible ring, and subjecting said ring to axial pressure between parallel flat surfaces to flatten its radial faces and reduce it to the desired cross section.

11. That process of making strong, tough and durable radially expansible split packing rings capable of sliding in contact with the inner surface of a cylinder wall under normal working conditions without scoring the wall, which comprises as steps bending a length of hard steel wire to form a split ring of substantially the desired peripheral contour, and subjecting the ring, while circumferentially confined, to flatten its radial faces and axial pressure to reduce it to the desired radial cross section.

12. That process of making strong, tough and durable radially expansible split packing rings capable of sliding in contact with the inner surface of a cylinder wall under normal working conditions without scoring the wall, which comprises as steps bending a length of steel wire of at least 0.6 per cent carbon to form a split ring of substantially the desired peripheral contour, and subjecting the ring, while confined circumferentially both internally and externally, to pressure to reduce it to its final cross section.

13. That process of making piston packings which comprises as steps bending a length of steel of at least 0.5 per cent carbon to form a split ring of substantially the desired peripheral contour, placing said ring in a template having an annular groove of substantially the contour of the finished ring, said template groove being less in depth than the axial thickness of the ring, and subjecting the ring within the template groove to axial pressure to reduce it to the axial thickness of the template groove.

14. That process of making piston packings which comprises as steps bending a length of steel rod or wire of more than 0.5 per cent carbon and of approximately the cross section of the desired packing to form a split ring of substantially the desired peripheral contour, disposing the ring within a template member having an opening therethrough whose inner contour is substantially a replica of the outer contour of the finished ring, and subjecting the ring, within the template member, to axial pressure to flatten its end faces.

15. That process of making strong, tough and durable radially expansible split packing rings capable of sliding in contact with the inner surface of a cylinder wall under normal working conditions without scoring the wall, which comprises as steps bending a length of steel rod or wire of from 0.6 to 0.7 per cent carbon of approximately the cross section of the desired packing, to form a split ring of substantially the desired peripheral contour, disposing the ring within a template member having an opening therethrough whose inner contour is a substantial replica of the outer contour of the finished ring, placing an inner template member, whose outer contour is a substantial replica of the inner contour of the finished ring, within the ring, and subjecting the ring, while thus confined between the template members, to axial pressure.

16. That process of making strong, tough and durable radially expansible split packing rings capable of sliding in contact with the inner surface of a cylinder wall under normal working conditions without scoring the wall, which comprises as steps bending a length of hard steel rod or wire, of approximately the cross section of the desired packing, to form a split ring of substantially the desired peripheral contour, disposing the ring within a template member having an opening therethrough whose inner contour is a substantial replica of the outer contour of the finished ring, placing an inner template member, whose outer contour is a substantial replica of the inner contour of the finished ring, within the ring, placing the template members with the ring confined between them between parallel platen surfaces of a press, and causing said platen surfaces to approach and thereby to flatten the radial faces of the ring.

17. That process of making strong, tough and durable radially expansible split packing rings capable of sliding in contact with the inner surface of a cylinder wall under normal working conditions without scoring the wall, which comprises preparing a length of hard steel slightly shorter than the circumferential length of the desired ring and slightly thicker in an axial direction than the finished ring, bending said length of material to form a split, radially expansible ring, confining said ring within a space having substantially the circumferential contour and radial cross section of the desired finished ring, and subjecting the ring while so confined to axial pressure whereby to flatten its radial faces and to cause the ring to elongate circumferentially to its final dimensions.

18. That process of making strong, tough and durable radially expansible split packing rings capable of sliding in contact with the inner surface of a cylinder wall under normal working conditions without scoring the wall, which comprises as steps bending a length of hard steel to form a split radially expansible ring, confining said ring in a groove having spaced circumferential walls corresponding respectively to the desired shape of the inner and outer peripheral surfaces of the desired packing, and subjecting the ring while so confined to axial pressure to cause the metal of the ring to flow into contact with the opposed walls of said groove and simultaneously to shape the radial faces of the packing ring.

19. That process of making strong, tough and durable radially expansible split packing rings capable of sliding in contact with the inner surface of a cylinder wall under normal working conditions without scoring the wall, which comprises as steps subjecting an annular turn of steel rod of approximately 0.6 per cent carbon to pressure within a template having an axial thickness slightly less than that of the ring whereby to reduce the ring to the desired axial thickness and simultaneously to produce circumferentially extending ribs at the outer corners of the ring.

20. That process of making strong, tough and durable radially expansible split packing rings capable of sliding in contact with the inner surface of a cylinder wall under normal working conditions without scoring the wall, which comprises as steps subjecting a split ring of hard steel to axial pressure while confined, both internally and externally, within a template of an axial thickness slightly less than the axial thickness of the ring whereby to reduce the ring to its final desired thickness, and simultaneously to produce circumferential ribs at the outer corners of the ring.

Signed by me at Boston, Mass., this 13th day of September, 1927.

LEWIS C. MARSHALL.

DISCLAIMER 1,758,575.—*Lewis C. Marshall*, Walpole, Mass. PROCESS OF MAKING PISTON RINGS. Patent dated May 13, 1930. Disclaimer filed November 23, 1933, by the patentee.

Hereby enters this disclaimer to the subject matter of claims 2, 3, 11, 16, 17, and 18 except where the material employed is steel having a carbon content of at least 0.5%.

[*Official Gazette December 19, 1933.*]

inner surface of a cylinder wall under normal working conditions without scoring the wall, which comprises as steps subjecting a split ring of hard steel to axial pressure while confined, both internally and externally, within a template of an axial thickness slightly less than the axial thickness of the ring whereby to reduce the ring to its final desired thickness, and simultaneously to produce circumferential ribs at the outer corners of the ring.

Signed by me at Boston, Mass., this 13th day of September, 1927.

LEWIS C. MARSHALL.

DISCLAIMER 1,758,575.—*Lewis C. Marshall*, Walpole, Mass. PROCESS OF MAKING PISTON RINGS. Patent dated May 13, 1930. Disclaimer filed November 23, 1933, by the patentee.

Hereby enters this disclaimer to the subject matter of claims 2, 3, 11, 16, 17, and 18 except where the material employed is steel having a carbon content of at least 0.5%.

[*Official Gazette December 19, 1933.*]